United States Patent [19]

Billat

[11] Patent Number: 4,954,001

[45] Date of Patent: Sep. 4, 1990

[54] MULTI-PURPOSE CLEANING DEVICE, IN PARTICULAR FOR VEHICLE WINDOWS AND THE LIKE

[76] Inventor: Alain E. Billat, 49 avenue de Gouvieux, 60260 Lamorlaye, Oise, France

[21] Appl. No.: 412,663

[22] Filed: Sep. 26, 1989

[51] Int. Cl.⁵ .................. A47L 13/26; A47L 13/22
[52] U.S. Cl. .................. 401/139; 15/121; 401/27; 401/137
[58] Field of Search .............. 401/137–139, 401/23, 27; 15/121

[56] References Cited

U.S. PATENT DOCUMENTS

| 4,312,093 | 1/1982 | Raab | 15/121 |
| 4,742,595 | 5/1988 | Isaacs | 15/121 |
| 4,778,301 | 10/1988 | Sicotte | 401/139 |

Primary Examiner—Robert A. Hafer
Assistant Examiner—Kerry Owens
Attorney, Agent, or Firm—Becker and Associates

[57] ABSTRACT

The multi-purpose cleaning device defines a head with a portion on which is placed a wiping blade. The head has an underneath part for supporting a spongy body and is provided with a stirrup including at least one scraping rib. A handle is provided for carrying the head and contains a treatment agent which is projected by actuating a trigger.

7 Claims, 5 Drawing Sheets

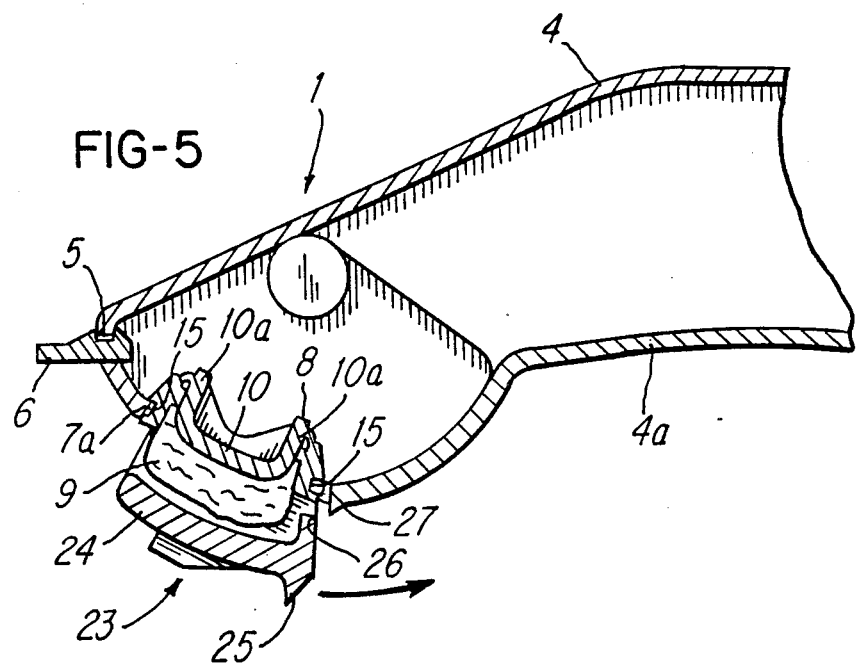
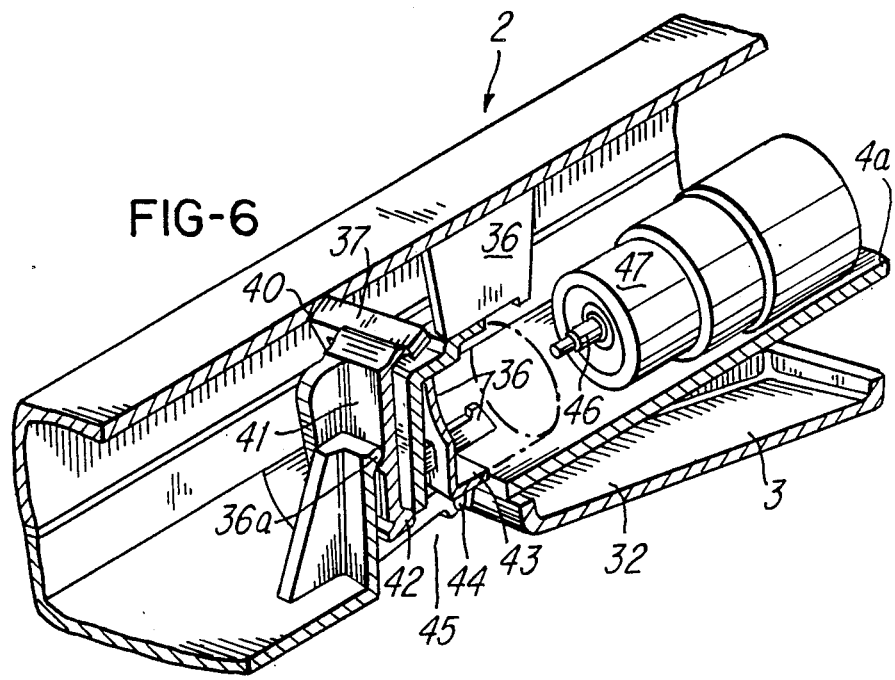

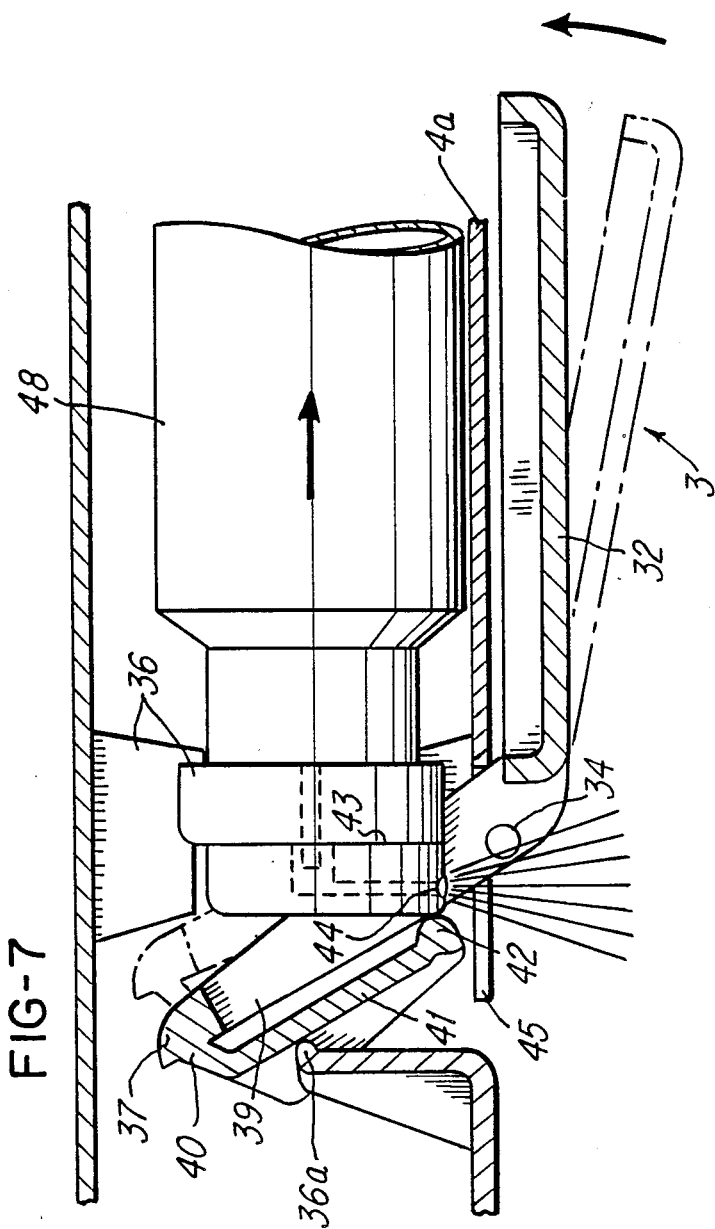

MULTI-PURPOSE CLEANING DEVICE, IN PARTICULAR FOR VEHICLE WINDOWS AND THE LIKE

BACKGROUND OF THE INVENTION

The present invention relates to a new multipurpose cleaning device usable in particular when vehicle windows have to be cleaned, whatever how these windows are sailed, meaning that the device enables a mere wiping, or a brushing followed by a wiping and possibly a scraping if the window is covered with frost or insects.

Moreover, the device of this invention makes it possible to treat the window, for example in order to apply a defrosting product, a wetting agent preventing rain water from forming drops, or a demisting or any other product which could prove useful.

The design of the device of the invention is such that it is of a simple and little costly realization from a limited number of parts which can all be made by molding from a plastics material The arrangement of the elements making the device makes moreover possible to easily change these parts of the device which may be worn out after a long usage.

SUMMARY OF THIS INVENTION

According to the invention, the multi-purpose cleaning device, particularly for vehicle windows defines a head with a portion on which is placed a wiping blade, the head having an underneath part for supporting a spongy body and being provided with a stirrup including at least one scraping rib, a handle being provided for carrying the head, the handle containing a treatment agent which is projected by actuating a trigger.

Various other features of the invention will become more apparent from the following detailed description.

DESCRIPTION OF THE DRAWINGS

An embodiment of the invention is shown by way of non limiting example in the accompanying drawings, wherein:

FIG. 5 is a partial cross-sectional view of the head of the device of FIG. 1;

FIG. 6 is a schematic perspective view, partly in cross section, showing a detail embodiment of the device of FIG. 1;

FIG. 7 is a schematic longitudinal cross section in a view showing an operational feature of the device of FIG. 1.

DESCRIPTION OF THE PREFERRED EMBODIMENT

Figure 1:
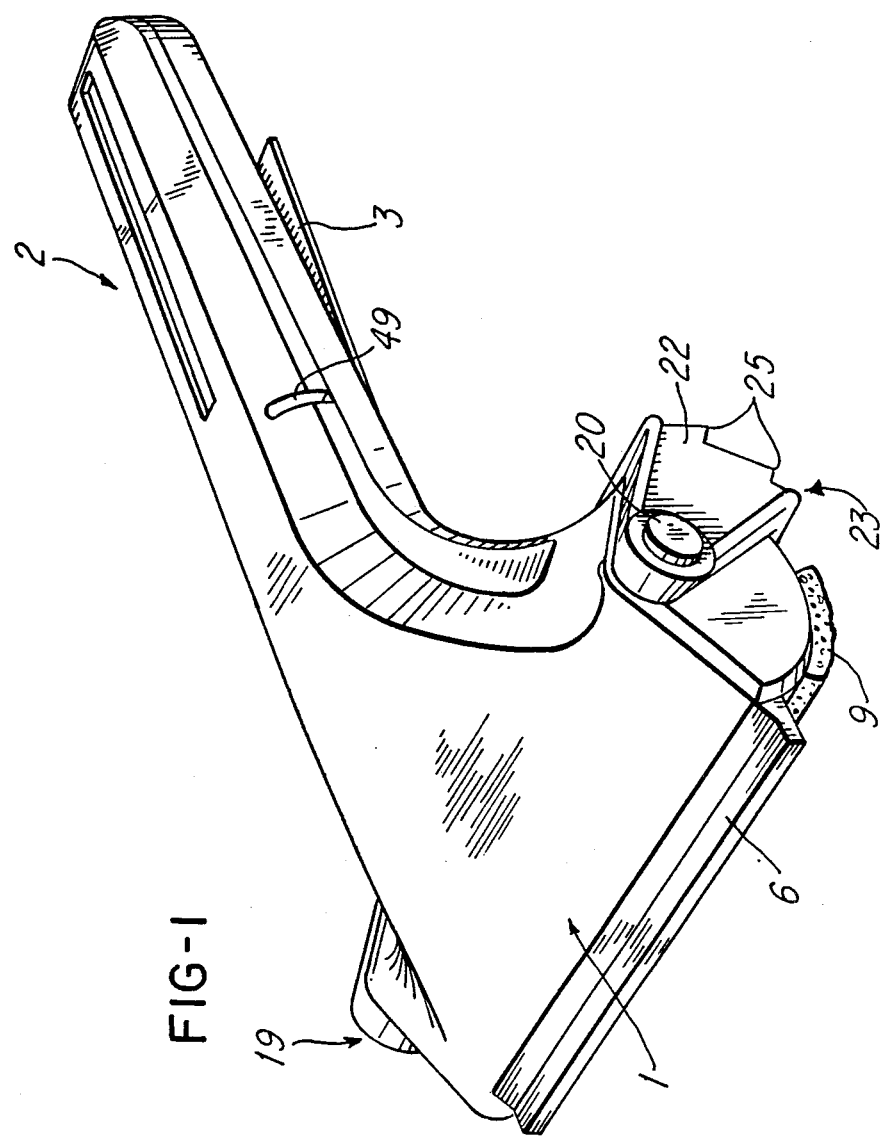
FIG. 1 is a perspective view of the multi-purpose cleaning device of the invention.

Referring now to the drawings, the device of the invention includes a head 1 from which is formed a handle underneath which is a trigger 3.

Figure 2:
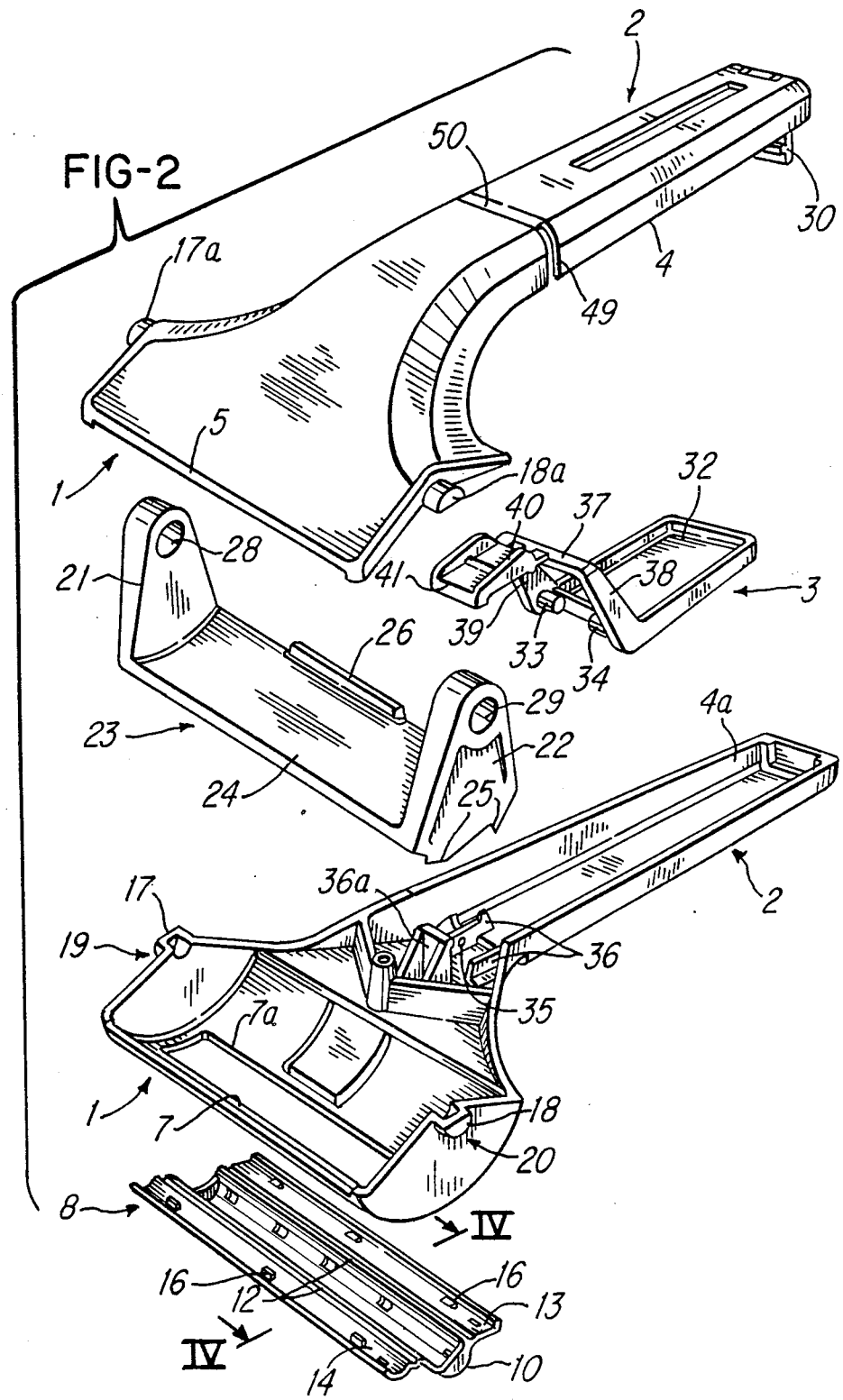
FIG. 2 is an exploded perspective view showing the main constituent members of the device of FIG. 1.

FIG. 2 shows that the head 1 and handle 2 are advantageously made of two complementary half-shells 4, 4a which can be easily molded from a plastics material simultaneously with a certain number of elements which they have to include therein.

The half-shells 4, 4a define, at the anterior portion of the head 1, a groove 5 inside which is inserted a flexible wiping blade 6, made for example of an elastomeric material.

The anterior portion of the head 1 defined by the half-shell 4a is formed with an aperture 7 which is well apparent in FIG. 2, and in which is inserted a support 8 for a spongy body 9 which is provided to protrude from the head 1.

Figure 4:
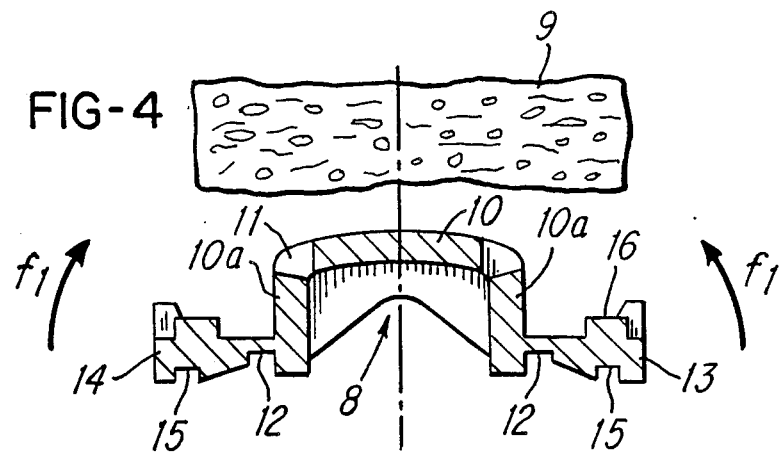
FIG. 4 is a cross-sectional view taken along line IV—IV of FIG. 2 of one of the elements of the device of FIG. 1.

The support 8 is advantageously made as shown in FIGS. 2, 4 and 5. The support 8 includes a U-shaped median portion 10 in the side branches 10a of which are formed openings 11. The ends of the side branches 10a are formed with thinned-out portions 12 for forming hinges from which extend wings 13, 14 having each a longitudinal slot 15. Studs 16 are moreover provided in the wings 13, 14. Some at least of the studs are in alignment with the openings 11 of the side branches 10a.

During assembling, the spongy body 9 is applied on the bulging top of the U-shaped median portion 10, then the wings 13, 14 are folded back in the direction of arrows $f_1$ (FIG. 4) for capturing a portion of the lateral edge of the spongy body 9 and clamping it between the wings 13, 14 and side branches 10a. When the pivoting motion of the wings 13, 14 is ended, the studs 16 extend through a portion of the spongy body 9 and are latched in the openings 11. The effect of this fixation mode of the spongy body 9 is to have it bulging out from above the U-shaped median portion 10. The wings 13, 14 are then engaged through the aperture 7 of the portion of the half-shell 4a which defines the head 1, this being illustrated in FIGS. 2 and 5 showing that the edges 7a of the aperture 7 are introduced inside the longitudinal slots of the support 8 which is thus snapped in.

FIG. 2 shows that each of the half-shells 4, 4a defines, on the lateral sides of the head 1, bosses 17, 17a and 18, 18a which are respectively complementary for forming pivot axes 19, 20 when the half-shells 4, 4a are assembled together.

The latching of the bosses 17, 17a, 18, 18a for forming the pivot axes 19, 20 is provided by branches 21 and 22 of a stirrup 23, the bottom 24 of which is arched and formed with at least one rib 25 extending from one branch 21 to the other 22.

Figure 3:
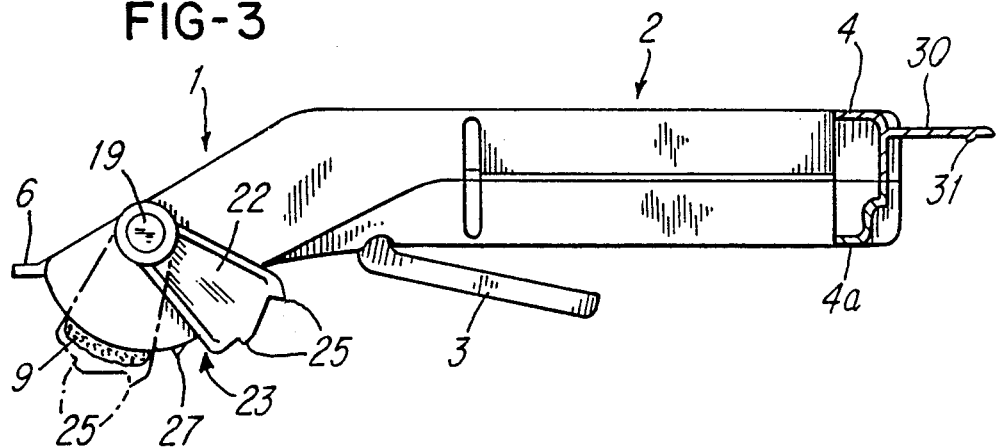
FIG. 3 is a side elevation view partly in cross-section of the device of FIG. 1.

The bottom 24 is also formed with an abutment 26 which may be resiliently deformed and is adapted for cooperating with a protrusion or tongue 27 of the half-shell 4a for securing against motion the stirrup 23 in a position in which its bottom 24 covers the spongy body 9, this being illustrated in full lines in FIG. 5 and also in phantom lines in FIG. 3.

The branches 21, 22 of the stirrup 23 are formed with holes 28, 29 and are resiliently deformable so that the bosses 17, 17a and 18, 18a, when assembled for forming the pivot axes 19, 20, can be engaged therein in order to latch the two half-shells 4, 4a together, while authorizing a pivotment of the stirrup 23.

FIGS. 2 and 3 show that one of the half-shells 4, 4a, for example the half-shell 4, carries at the end of its handle 2 a pivoting flap 30 including a latching protrusion 31 for providing its fixation with the other half-shell, in that case the half-shell 4a.

The extent over which protrudes the deformable abutment 26 is chosen such that the abutment 26 will rub against the arched surface of the part of half-shell 4a forming a portion of the head 1, so that the stirrup 23 can be kept immobile by friction in the position shown in FIGS. 1 and 3 in full lines when the stirrup 23 and the ribs 25 it includes are not to be used.

The stirrup 23 is made of a plastics material, having preferably a hardness sufficient for the rib or ribs 25 to form a scraper, particularly in order that the ribs 25 can defrost a window, such as a wind-screen or windshield of an automobile vehicle.

FIG. 2 shows that the trigger 3 includes an actuating portion 32 at one end of which are formed pins 33, 34, turned toward one another and adapted for being engaged, by a resilient deformation, within holes 35, of which one only is shown in the drawings, provided in girders of a cradle 36.

The trigger 3 forms, from ends of the pins 33, 34, a clevis 37 with slanting arms 38, 39. The clevis 37 may be used as a hinge, via a spindle 40 which can be made of a thinned-out portion as shown, for a rocker member 41 bearing against an abutment 36a of the cradle 36, this being clearly shown in FIGS. 6 and 7.

A free end of the rocker member 41 forms a support flange 42 for operation of a ring 43 which is movable axially but not in rotation and is guided in the cradle 36, and which includes a spraying nozzle 44 (FIG. 7) placed opposite an aperture 45 of the half-shell 4a (FIG. 6). The spraying ring 43 is adapted for housing the mobile head 46 of a sprayer 47 mounted on a flask 48 containing a cleaning, defrosting or demisting agent, or a product which can fulfill a similar function.

The flask 48 is housed inside the handle 2.

In order to easily fill the flask 48, it is advantageous that one of the half-shells 4, 4a, for example the half-shell 4, is formed with a lateral cut-out 49 and that its top is thinned-out as shown at 50 in FIG. 2, for forming a pivoting flap affording an access inside the handle 2.

FIG. 7 particularly shows that, by operating the trigger 3 from the position shown in phantom lines to the position shown in full lines, the trigger 3 will pivot about the pins 34, 33, and consequently the clevis 37 will pivot also from the position shown in phantom lines to the position shown in full lines. Effect of the above movement is to have the rocker member 41 to slide against the abutment 36a, so that the rocker member 41 tips or rocks by exerting, via the support flange 42, a pressure on the spraying ring 43, thereby causing the operation of the sprayer.

As is apparent from the foregoing disclosure, the device enables, when in the position shown in FIG. 3, cleaning of a window by spraying first a cleaning agent by successive pressures applied on the trigger 3. Then, the projected liquid is spread out and the window is rubbed by the spongy body 9, and finally the window is wiped by the flexible blade 6.

When the device has to be stored, it is possible to protect the spongy body 9 against dust by bringing the bottom 24 of the stirrup 23 over the spongy body.

In the position in which the bottom 24 of the stirrup 23 covers the spongy body 9 (position shown in FIG. 5), the stirrup 23 is held in position, on the one hand, by the spongy body 9 and, on the other hand, by the deformable abutment 26 bearing against the protrusion or tongue 27, as shown in FIG. 5. In this position, the stirrup 23 can also be used as a scraper, for example for defrosting, by using the rib or ribs 25 it includes. When several ribs 25 are provided, it is advantageous that one rib at least has sawteeth, thereby facilitating the loosening of the frost.

The specific embodiment of the invention as herein shown and described is for illustrative purposes only, and various changes will be understood as forming a part of the present invention insofar as they fall within the spirit and scope of the appended claims.

I claim:

1. A multi-purpose cleaning device, in particular for vehicle windows, comprising:
    a head that includes a portion on which is disposed a wiper blade, with said head having an underneath part;
    a spongy body that is supported on said underneath part of said head;
    a stirrup that is disposed on said head and includes at least one scraping rib;
    a handle that carries said head and contains a treatment agent;
    trigger means disposed on said handle for dispensing said treatment agent;
    said head and said handle being an assembly of two complementary half shells, one of which forms a cradle for housing spraying means of a flask that is accommodated in said handle and contains said treatment agent;
    a head portion of one of said half shells is provided with an aperture that has edges that form a retaining means for a support means for said spongy body; and
    said support means comprises a substantially U-shaped median portion having sides that are connected via hinge means to respective wings that are each provided with studs that cooperate with openings of said support means to fix said spongy body thereon.

2. A device according to claim 1, in which one of said half shells is provided with an articulated portion to provide access into said handle.

3. A multi-purpose cleaning device, in particular for vehicle windows, comprising:
    a head that includes a portion on which is disposed a wiper blade, with said head having an underneath part;
    a spongy body that is supported on said underneath part of said head;
    a stirrup that is disposed on said head and includes at least one scraping rib;
    a handle that carries said head and contains a treatment agent;
    trigger means disposed on said handle for dispensing said treatment agent;
    said head and said handle being an assembly of two complementary half shells, one of which forms a cradle for housing spraying means of a flask that is accommodated in said handle and contains said treatment agent; and
    said stirrup is provided with side branches that are each provided with a hole; and in which a head portion of each of said half shells is provided with complementary bosses that in an assembled state of said handle form pivot axes for disposition in said holes of said side branches of said stirrup, which is thereby pivotable while at the same time forming latching means for said half shells.

4. A device according to claim 2, in which said stirrup has a bottom that extends between said side branches thereof, with said bottom having on an inside thereof, remote from said at least one scraping rib, a deformable abutment for cooperation with an immobilization tongue of one of said half shells in a position where said at least one scraping rib is in an operable position, with said bottom of said stirrup thereby providing a protection means for said spongy member.

5. A multi-purpose cleaning device, in particular for vehicle windows, comprising:
- a head that includes a portion on which is disposed a wiper blade, with said head having an underneath part;
- a spongy body that is supported on said underneath part of said head;
- a stirrup that is disposed on said head and includes at least one scraping rib;
- a handle that carries said head and contains a treatment agent;
- trigger means disposed on said handle for dispensing said treatment agent;
- said head and said handle being an assembly of two complementary half shells, one of which forms a cradle for housing spraying means of a flask that is accommodated in said handle and contains said treatment agent; and
- one of said half shells is provided with a pivotable flap for latching said half shells together.

6. A device according to claim 18, in which said spraying means includes head means, and in which said trigger means is articulated in said handle and is connected to a rocker member that is provided with a support flange for a push activation of said head means of said spraying means.

7. A device according to claim 5, in which a head portion of one of said half shells is provided with an aperture that has edges that form a retaining means for a support means for said spongy body.

* * * * *